(12) United States Patent  (10) Patent No.: US 7,773,601 B2
Nakajima et al.  (45) Date of Patent: Aug. 10, 2010

(54) WIRELESS COMMUNICATION APPARATUS

(75) Inventors: Tetsu Nakajima, Yokohama (JP);
Tomoko Adachi, Urayasu (JP);
Masahiro Takagi, Tokyo (JP); Tomoya Tandai, Tokyo (JP); Yoriko Utsunomiya, Tokyo (JP); Yasuyuki Nishibayashi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 480 days.

(21) Appl. No.: 11/744,253

(22) Filed: May 4, 2007

(65) Prior Publication Data

US 2007/0201364 A1 Aug. 30, 2007

Related U.S. Application Data

(63) Continuation of application No. PCT/JP2006/318803, filed on Sep. 15, 2006.

(30) Foreign Application Priority Data

Sep. 29, 2005 (JP) ............................. 2005-285324

(51) Int. Cl.
*H04L 12/28* (2006.01)
(52) U.S. Cl. ...................... 370/394; 370/328
(58) Field of Classification Search .................. None
See application file for complete search history.

(56) References Cited

U.S. PATENT DOCUMENTS

| 7,444,443 | B2 * | 10/2008 | Sharma et al. ................ 710/30 |
| 2002/0089959 | A1 * | 7/2002 | Fischer et al. ............... 370/338 |
| 2005/0265297 | A1 | 12/2005 | Nakajima et al. |
| 2005/0276266 | A1 * | 12/2005 | Terry ......................... 370/394 |
| 2006/0059273 | A1 * | 3/2006 | Carnevale et al. .......... 709/250 |

(Continued)

FOREIGN PATENT DOCUMENTS

EP 1 553 730 A 7/2005

(Continued)

OTHER PUBLICATIONS

Syed Aon Mujtaba, et al., "Aggregation Exchange Sequence and related rules", IEEE P802.11 Wireless LANs, TGn Sync Proposal Technical Specification, IEEE 802.11-04/0889r7, Chapter 7, Section 1, Jul. 8, 2005, p. 36-37.

(Continued)

*Primary Examiner*—Phirin Sam
(74) *Attorney, Agent, or Firm*—Oblon, Spivak, McClelland, Maier & Neustadt, L.L.P.

(57) ABSTRACT

A wireless communication apparatus is disclosed. A transmitting device transmits a first aggregation frame in which first transmission data frames are aggregated. A measuring device measures a number value of retransmission of each of the first transmission data frames. A storage stores a limiting value of the number value of retransmission. A determination device determines whether the number value of retransmission of each of the first transmission data frames exceeds the limiting value. A transmission buffer buffers the first transmission data frames for which it is determined that the number value of retransmission does not exceed the limiting value, and discards the first transmission data frames for which it is determined that the number value of retransmission exceeds the limiting value, of the first transmission data frames. A retransmitting device retransmits the first aggregation frame in which the first transmission data frames buffered in the transmission buffer are aggregated.

10 Claims, 8 Drawing Sheets

U.S. PATENT DOCUMENTS

| | | | |
|---|---|---|---|
| 2006/0104300 A1* | 5/2006 | Ho | 370/428 |
| 2006/0120403 A1* | 6/2006 | Murata et al. | 370/468 |
| 2006/0221879 A1 | 10/2006 | Nakajima et al. | |
| 2006/0256792 A1* | 11/2006 | Kwong et al. | 370/394 |
| 2006/0256818 A1* | 11/2006 | Shvodian et al. | 370/474 |
| 2007/0064718 A1* | 3/2007 | Ekl et al. | 370/432 |
| 2007/0168825 A1* | 7/2007 | Jalali et al. | 714/748 |
| 2007/0206497 A1* | 9/2007 | Plamondon et al. | 370/231 |

FOREIGN PATENT DOCUMENTS

| | | |
|---|---|---|
| EP | 1 601 127 A | 11/2005 |
| JP | 2003-60562 | 8/2001 |
| JP | 2004-7336 | 1/2004 |
| WO | WO 2004/042953 A | 5/2004 |
| WO | 2005/060198 A1 | 6/2005 |

OTHER PUBLICATIONS

"Part 11: Wireless LAN Medium Access Control (MAC) and Physical Layer (PHY) specifications: Amendment: Medium Access Control (MAC) Quality of Service (QoS) Enhancements", IEEE 802.11e Draft 13.0, Jan. 2005.

U.S. Appl. No. 11/847,852, filed Aug. 30, 2007, Nakajima, et al.

U.S. Appl. No. 11/853,437, filed Sep. 11, 2007, Hirano, et al.

Yasuyuki Nishibayashi, et al., "Proposal of MAC Frame Aggregation Using Selective Repeat Retransmission in Wireless LANs", Technical Report of IEICE, The Institute of Electronics, Information and Communication Engineers, vol. 104, No. 438, Nov. 12, 2004, pp. 31-36 (with English Abstract).

Syed Aon Mujtaba, "TGn Sync Proposal Technical Specification", IEEE 802.11-04/0889r6, URL, https://mentor.ieee.org/802.11/dcn/04/11-04-0889-06-000n-tgnsync-technical-specification.doc, May 2005, pp. 13, 40, 41, 45, 46, 58 and 59 (with English Abstract).

* cited by examiner

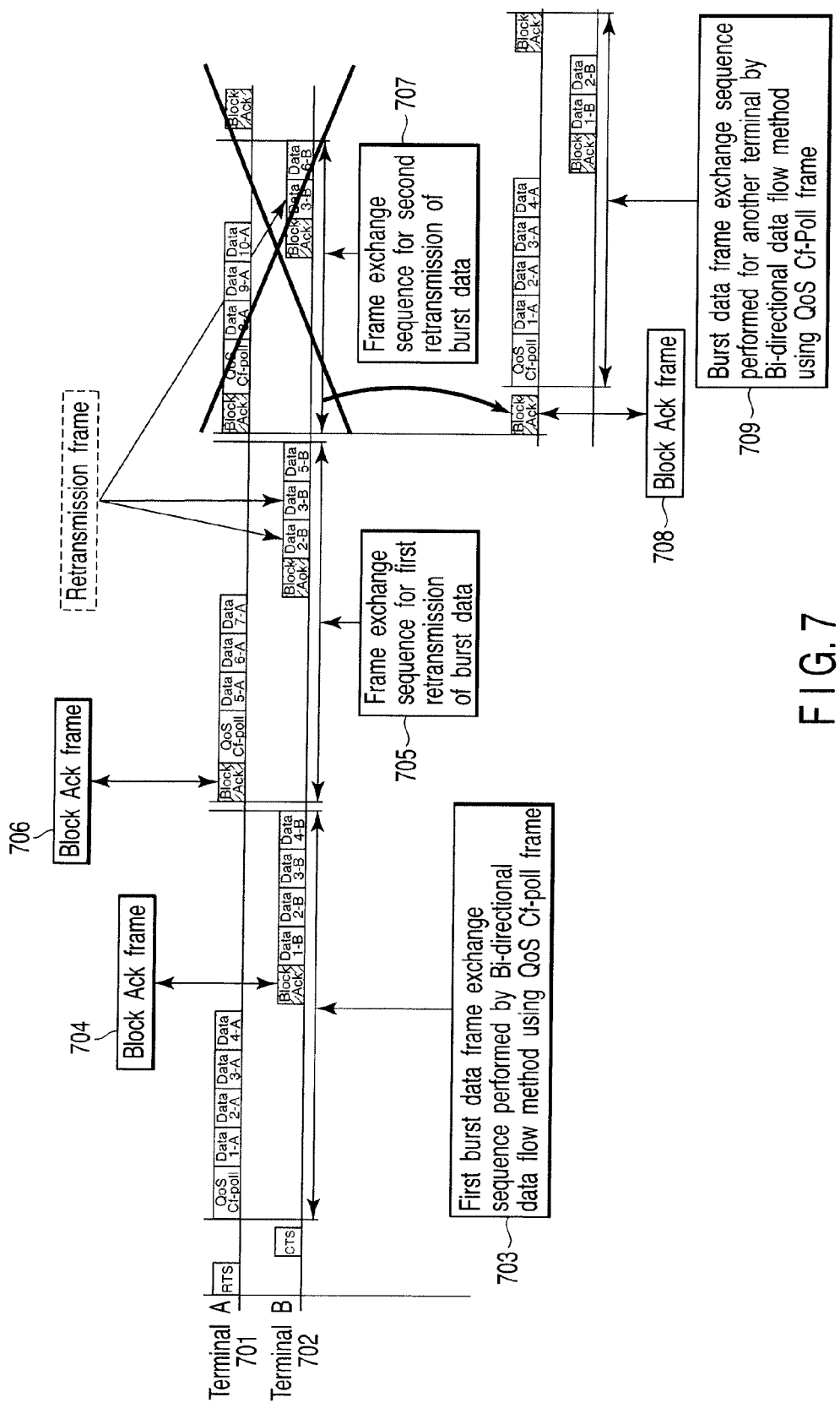
F I G. 7

WIRELESS COMMUNICATION APPARATUS

CROSS REFERENCE TO RELATED APPLICATIONS

This is a Continuation Application of PCT Application No. PCT/JP2006/318803, filed Sep. 15, 2006, which was published under PCT Article 21(2) in English.

This application is based upon and claims the benefit of priority from prior Japanese Patent Application No. 2005-285324, filed Sep. 29, 2005, the entire contents of which are incorporated herein by reference.

BACKGROUND OF THE INVENTION

1. Field of the Invention

The present invention relates to a wireless communication apparatus suitable for a cell phone or wireless LAN apparatus.

2. Description of the Related Art

In a CSMA/CA type wireless communication system represented by wireless LAN communication defined by IEEE 802.11 in conventional wireless communication systems, if an acknowledgement frame (Ack frame) for transmission data cannot be received, the transmission data is retransmitted. In this case, on the basis of the retry count and lifetime unique to each transmission data, retransmission is limited by using the retry count and transmittable time of the transmission data.

In the QoS (Quality of Service)-extended wireless LAN standard IEEE 802.11e, communication is separately performed in two periods, i.e., a contention-based period during which each terminal station performs distributed access by using a CSMA/CA (Carrier Sense Multiple Access/Collision Avoidance) method, and a contention-free period during which a base station performs centralized control. The latter access control method using centralized control is called an HCCA (HCF Controlled Channel Access) method, and the former access control method using distributed control is called an EDCA (Enhanced Distributed Channel Access) method. A wireless LAN terminal is able to access a medium by using one of these access control methods, acquire TXOP (transmission opportunity) representing a period during which a plurality of data can be transmitted, and communicate data during the TXOP period (see IEEE 802.11e Draft 13.0, IEEE P802.11e/D13.0, January 2005 below).

In IEEE 802.11n aiming at high-speed transmission has proposed a method in which a terminal having acquired a TXOP period gives a part of this TXOP period to the data receiving terminal, and bi-directional communication is performed by a piggy back method in the TXOP period, thereby increasing the transmission efficiency. This method is called a bi-directional data flow or reverse direction.

In IEEE 802.11n, unlike in the existing IEEE 802.11 standard, an aggregation frame is formed by collecting (i.e., aggregating) a plurality of data into one data frame, and transmitted as one data frame, thereby reducing the overhead existing between individual data frames (when they are not aggregated).

To acquire a TXOP period for transmitting an aggregation frame in the EDCA method, the transmitting terminal (initiator) transmits an IAC frame, and the receiving terminal (responder) returns an RAC frame when SIFS has elapsed after that, thereby performing IAC-RAC frame exchange. Alternatively, RTS-CTS frame exchange defined by IEEE 802.11 may also be used instead of IAC-RAC frame exchange.

When IAC-RAC frame exchange is to be performed in the bi-directional data flow, the data receiving terminal notifies a data frame length and transmission data rate, which the terminal can transmit when given a part of a TXOP period, by writing the data in an RAC frame.

On the basis of the values written in the RAC frame, the transmitting terminal determines that part (RDG duration: reverse direction communication permission period) of the TXOP period, which is to be given after an aggregation frame is transmitted. The transmitting terminal writes the determined RDG duration in an IAC frame, attaches the IAC frame to the head of the aggregation frame, and transmits the aggregation frame when SIFS has elapsed after the RAC frame is received. The receiving terminal having received the aggregation frame having the IAC frame attached to the head must notify the reception status by a Block Ack (block acknowledgement) frame when SIFS has elapsed after the aggregation frame is received from the transmitting terminal. When the bi-directional data flow is used, the receiving terminal transmits the Block Ack frame when SIFS has elapsed by using the piggy back method by which several data frames are transmitted as they are aggregated in the Block Ack frame, thereby simultaneously transmitting the data and Block Ack frame. In this case, the transmission time of the aggregation frame formed by aggregating several data frames in the Block Ack frame cannot exceed the time of the RDG duration written in the IAC frame.

In this manner, a part of the TXOP period acquired by the transmitting terminal can be given to the receiving terminal. If the receiving terminal further requests an RDG duration when transmitting an aggregation frame by the piggy back method, the receiving terminal can further request an RDG duration by writing, in an RAC frame, a data frame length and transmission data rate prepared for transmission, and returning the RAC frame by attaching it to the head of the aggregation frame to be transmitted by the piggy back method (see TGn Sync Proposal Technical Specification, IEEE 802.11-04/889r4, March 2005).

Also, JP-A 2003-60562 (KOKAI) below describes that retransmission is controlled by adjusting the signal length of a burst signal in burst communication by radio.

The following problem arises if the retransmission limiting method for each transmission data defined in the existing IEEE 802.11 is applied to the retransmission limiting method for burst transmission such as the Block Ack method defined in the conventional IEEE 802.11e. That is, if data in which error has occurred by burst transmission is transmitted simultaneously with new transmission data, burst data transmissions are excessively concentrated to the same terminal.

Also, when the transmission opportunities of data having a plurality of priority degrees are grouped in accordance with the priority degrees as defined in the conventional IEEE 802.11e, the transmission opportunities are excessively given to the same priority degree.

The above problem similarly arises in the aggregation method by which a plurality of transmission data are aggregated into one frame as burst data. The problem also similarly arises in the bi-directional data flow method by piggy back in which a part of the acquired TXOP period is given to the receiving terminal.

Furthermore, a new problem of the bi-directional data flow method is that although data are transmitted from both the transmitting side and receiving side in the bi-directional data flow method, if no transmission error occurs in the data transmitted from the transmitting side and an error occurs in only the data transmitted from the receiving side, the transmitting side need not retransmit the data. Therefore, no retransmission band is allocated to the receiving side, so the data in which the error has occurred is not retransmitted unless the receiving terminal reacquires the transmission right.

In addition, when data transmission is performed from a terminal station to a base station in the HCCA method of IEEE 802.11e, a QoS Cf-poll frame is transmitted to give the terminal station the transmission right of a TXOP period, and the terminal having acquired the transmission right transmits data during this TXOP period. If a transmission error or the like occurs in the TXOP period and TXOP reallocation is immediately performed, TXOP allocations may be concentrated to the same terminal.

BRIEF SUMMARY OF THE INVENTION

It is, therefore, an object of the present invention to provide a wireless communication apparatus used in a system which allows a plurality of terminals or a plurality of priority degrees to equally secure bands by preventing excess concentration of transmissions by the same terminal or the same priority degree when burst transmission and retransmission are performed.

According to one aspect of the present invention, a wireless communication apparatus includes a transmitting device which transmits a first aggregation frame in which first transmission data frames are aggregated; a measuring device which measures a number value of retransmission of each of the first transmission data frames; a storage to store a limiting value of the number value of retransmission; a determination device which determines whether the number value of retransmission of each of the first transmission data frames exceeds the limiting value; a transmission buffer which buffers the first transmission data frames for which it is determined that the number value of retransmission does not exceed the limiting value, and discards the first transmission data frames for which it is determined that the number value of retransmission exceeds the limiting value, of the first transmission data frames; and a retransmitting device which retransmits the first aggregation frame in which the first transmission data frames buffered in the transmission buffer are aggregated.

BRIEF DESCRIPTION OF THE SEVERAL VIEWS OF THE DRAWING

FIG. 7 is a view for explaining a retransmission limiting method according to the third embodiment.

DETAILED DESCRIPTION OF THE INVENTION

First Embodiment

An embodiment will be explained below by taking IEEE 802.11 of wireless LAN communication as one of communication methods using a wireless communication system. However, this wireless LAN communication method of IEEE 802.11 is regarded as one of wireless communication methods from which the effects of the present embodiment can be expected, so the present embodiment is applicable not only to IEEE 802.11 but also to general wireless communication methods. Also, the embodiment will be explained by taking, as an example, a case in which the piggy back type bi-directional data flow method proposed in IEEE 802.11n is applied as one of burst transmission communication methods. Note that a burst transmission communication method to which the present embodiment is applicable is not limited to the bi-directional data flow method. For example, the present embodiment is applicable to a method which uses a poll type frame instead of a band allocation method for a responder terminal in the bi-directional data flow method.

As is well known, in wireless communication by CSMA/CA, a wireless communication terminal which intends to transmit data packet by packet performs carrier sense before transmission of each data, thereby avoiding collision with packets from other terminals. In burst transmission in which a plurality of transmission data are successively transmitted, carrier sense is performed for only the first packet (transmission data) of burst data, and the other packets of the burst data are transmitted without performing any carrier sense.

In a burst transmission method using an aggregation method, a plurality of transmission data are aggregated into one frame and the frame is transmitted by burst transmission. In this case, various aggregation methods are possible. Examples are a method in which a plurality of MAC frames are aggregated into one PHY frame and a preamble is attached to only the head of the frame, and a method which increases the error estimation accuracy by inserting a mid preamble in the middle of one PHY frame. The present embodiment is not limited to any specific aggregation method, and applicable to general communication methods which perform burst-like transmission. In addition, the present embodiment is applicable not only to transmission using aggregation frames, but also to a communication method which performs burst transmission in which data frames are spaced by SIFS periods or RIFS periods in a usable communication period.

Figure 1:
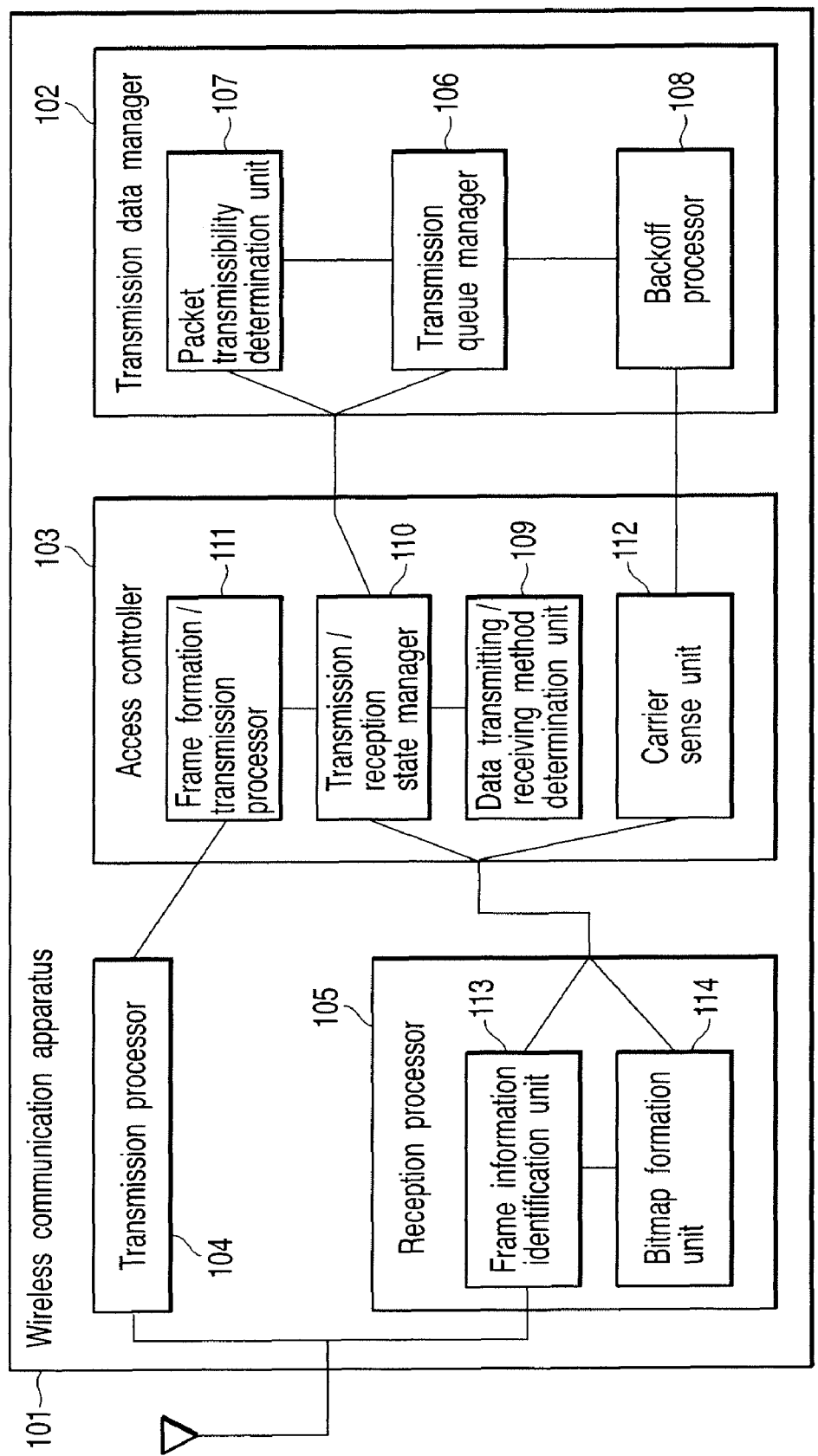
FIG. 1 is block diagram showing a wireless communication apparatus according to an embodiment.

As shown in FIG. 1, a wireless communication apparatus 101 according to this embodiment comprises a transmission data manager 102 which has a transmission queue for buffering transmission data and performs a retransmission limitation unique to each transmission data, an access controller 103 which determines a data transmitting/receiving method, performs access control in processes of transmitting, receiving, and retransmitting data frames and acknowledgement frames, and, when a plurality of transmission data are to be transmitted by burst transmission, performs a retransmission limitation for each frame exchange sequence of burst data, which is different from the retransmission limitation unique to each transmission data performed by the transmission data manager 102, a transmission processor 104 which performs a data transmitting process, and a reception processor 105 which performs a received frame identification process and a receiving process by which, e.g., a bitmap of acknowledgement is formed.

The transmission data manager 102 comprises a transmission queue manager 106 which has a transmission queue for buffering transmission data, a packet transmissibility determination unit 107 which performs a retransmission limitation unique to each transmission data, and a backoff processor 108 which performs backoff processing based on CSMA/CA.

The transmission queue manager 106 includes a counter for counting the retry count of each transmission data.

The packet transmissibility determination unit 107 stores the limit of the lifetime for each frame exchange sequence of each transmission data. The packet transmissibility determination unit 107 compares the stored lifetime limit or retry limit with the retry count of each transmission data obtained by the transmission queue manager 106 by using the counter or the lifetime of each transmission data obtained by a transmission/reception state manager 110 (to be described later) by using a timer, thereby determining whether to retransmit each packet.

The access controller 103 comprises a data transmitting/receiving method determination unit 109 which determines, e.g., a data transmitting method to be used in data transmission such as an aggregation method or bi-directional data flow method, the length of TXOP, and a retransmission limiting method according to the present embodiment which is performed for each frame exchange sequence of burst data, the transmission/reception state manager 110 which manages the timings of data transmission/reception performed by the transmitting/receiving method determined by the data transmitting/receiving method determination unit 109, performs access control in a retransmission process and the like, and, when a plurality of transmission data are to be transmitted by burst transmission, performs a retransmission limitation for each frame exchange sequence of burst data separately from the retransmission limitation unique to each transmission data which is performed by the transmission data manager 102, a frame formation/transmission processor 111 which forms and transmits various control frames and aggregation frames, and a carrier sense unit 112 which manages carrier sense information required in the backoff processor 108.

The transmission/reception state manager 110 includes a timer for measuring the lifetime for each frame exchange sequence of burst data.

The reception processor 105 comprises a frame information identification unit 113 which identifies the success or failure of the reception of a received frame and control information in the received frame, and a bitmap formation unit 114 which, when burst data is received, forms a bitmap of acknowledgement to be placed in an acknowledgement frame from the success or failure of the reception of each frame in the burst data.

Figure 2:
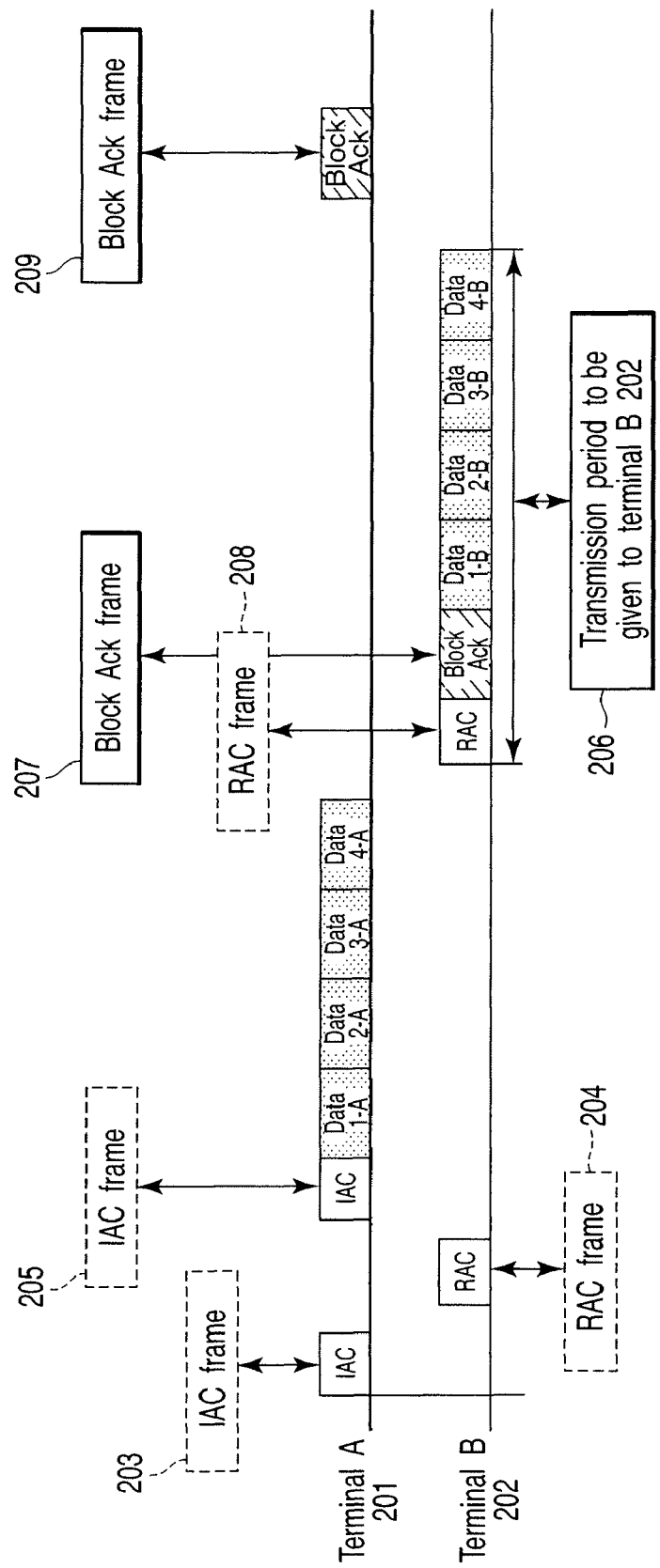
FIG. 2 is a view for explaining a burst transmission method performed by the bi-directional data flow method.

First, a burst transmission method performed by the bi-directional data flow method will be explained with reference to FIG. 2. In the bi-directional data flow method, a terminal A 201 having acquired the data transmission right describes the use of the bi-directional data flow method in an IAC (Indicator Aggregation Control) frame 203, and transmits it to a terminal B 202. The terminal B 202 having received the IAC frame 203 describes, in an RAC (Responder Aggregation Control) frame 204, a transmission rate and frame length to be transmitted when the transmission right is given by the bi-directional data flow, and returns the RAC frame 204. The terminal A 201 having received the RAC frame 204 forms an aggregation frame by aggregating a plurality of transmission data and attaching the IAC frame 205 to the head of the data, and transmits the aggregation frame. In this case, a transmission period 206, which is determined on the basis of, e.g., the information described in the RAC frame 204, to be given to the terminal B 202 is described in the IAC frame 205. When receiving the aggregation frame having the IAC frame 205 attached to the head, the terminal B 202 forms a Block Ack frame 207 containing the reception status of each data. Then, the terminal B 202 forms an aggregation frame by adding an RAC frame 208 before the Block Ack frame 207 and aggregating a plurality of transmission data to be transmitted to the terminal A 201 after the Block Ack frame 207, and returns the aggregation frame. Note that the transmission period of the aggregation frame returned by the terminal B 202 does not exceed the transmission period 206 given from the terminal A 201 to the terminal B 202. Note also that it is not always necessary to use the RAC frame 208. After that, the terminal A 201 returns a Block Ack frame 209 as the reception status of the data from the terminal B 202. Communication is performed by the flow as described above. Although the aggregation frames make one round trip in FIG. 2, they may also be transmitted and received a plurality of number of times. The operation of the bi-directional data flow method is described in detail in TGn Sync Proposal Technical Specification, IEEE 802.11-04/889r4, March 2005 described earlier.

Figure 3:
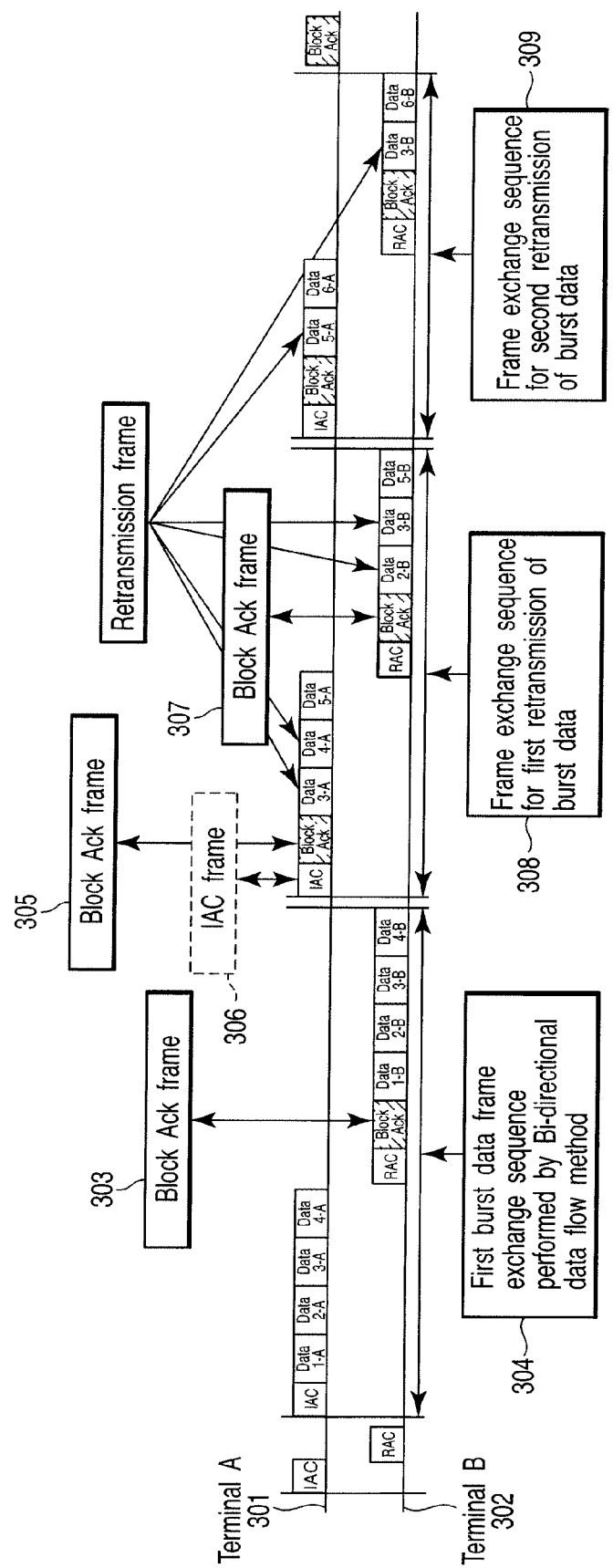
FIG. 3 is a view for explaining a conventional retransmission method in burst transmission.

In a conventional retransmission method shown in FIG. 3, after frame exchange between an IAC frame and RAC frame is completed, a terminal A 301 calculates an RDG duration as a transmission period to be allocated to a terminal B 302, writes the RDG duration in the IAC frame, forms an aggregation frame together with a plurality of transmission data Data 1-A, Data 2-A, Data 3-A, and Data 4-A from the terminal A 301, and transmits the aggregation frame. The terminal B 302 having received the plurality of transmission data Data 1-A, Data 2-A, Data 3-A, and Data 4-A transmitted by the terminal A 301 forms a Block Ack frame 303 describing the reception statuses of the plurality of transmission data. The terminal B 302 forms an aggregation frame which falls within the range of the RDG duration as the transmission period given from the terminal A 301, by aggregating the Block Ack frame 303, the RAC frame, and the plurality of data Data 1-B, Data 2-B, Data 3-B, and Data 4-B to be transmitted to the terminal A 301, and returns this aggregation frame to the terminal A 301. This sequence is a first burst data frame exchange sequence 304 performed by the bi-directional data flow method.

In the first burst data frame exchange sequence 304 performed by the bi-directional data flow method, if Data 3-A and Data 4-A transmitted by the terminal A 301 are transmission errors, the terminal A 301 detects from the reception statuses described in the Block Ack frame 303 that Data 3-A and Date 4-A must be retransmitted. Therefore, when returning a Block Ack frame 305 describing the reception statuses of a plurality of transmission data Data 1-B, Data 2-B, Data 3-B, and Data 4-B transmitted by the terminal B 302, the terminal A 301 does not return only the Block Ack Frame 209 as shown in FIG. 2, but forms an aggregation frame by aggregating the Block Ack frame 305, an IAC frame 306, Data 3-A and Data 4-A as the retransmission data, and Data 5-A as new data, and transmits this aggregation frame. The terminal A 301 detects that Data 2-B and Data 3-B transmitted by the terminal B 302 are transmission errors when forming the Block Ack frame 305, so the terminal A 301 describes in the IAC frame 306 a period during which the terminal B 302 can retransmit Data 2-B and Data 3-B. Then, the terminal B 302 having received the aggregation frame containing the Block Ack frame 305 and IAC frame 306 and given the transmission period described in the IAC frame 306 describes in a Block Ack frame 307 the reception statuses of Data 3-A and Data 4-A retransmitted from the terminal A 301 and Data 5-A as the new data, forms an aggregation frame which falls within the range of the RDG duration as the transmission period given from the terminal A 301, by aggregating an RAC frame, the Block Ack frame 307, Data 2-B and Data 3-B as the retransmission data from the terminal B 302, and Data 5-B as new data, and returns this aggregation frame to the terminal A 301.

If a transmission error occurs in the data transmitted by a frame exchange sequence 308 for the first retransmission of the burst data, an aggregation frame as burst data is retransmitted again. Referring to FIG. 3, in a frame exchange sequence 309 for the second retransmission of the burst data, Data 5-A from the terminal A 301 and Data 3-B from the terminal B 302 are retransmission data, and an aggregation frame formed by further aggregating new data after these retransmission data is transmitted and received. If transmission errors keep occurring in some data transmitted from the terminal A 301 or terminal B 302 as described above, the problem that data transmission/reception is kept performed by the bi-directional data flow method arises. Note that the transmission interval between individual data shown in the transmitting/receiving methods of FIGS. 2 and 3 is an SIFS period.

Figure 4:
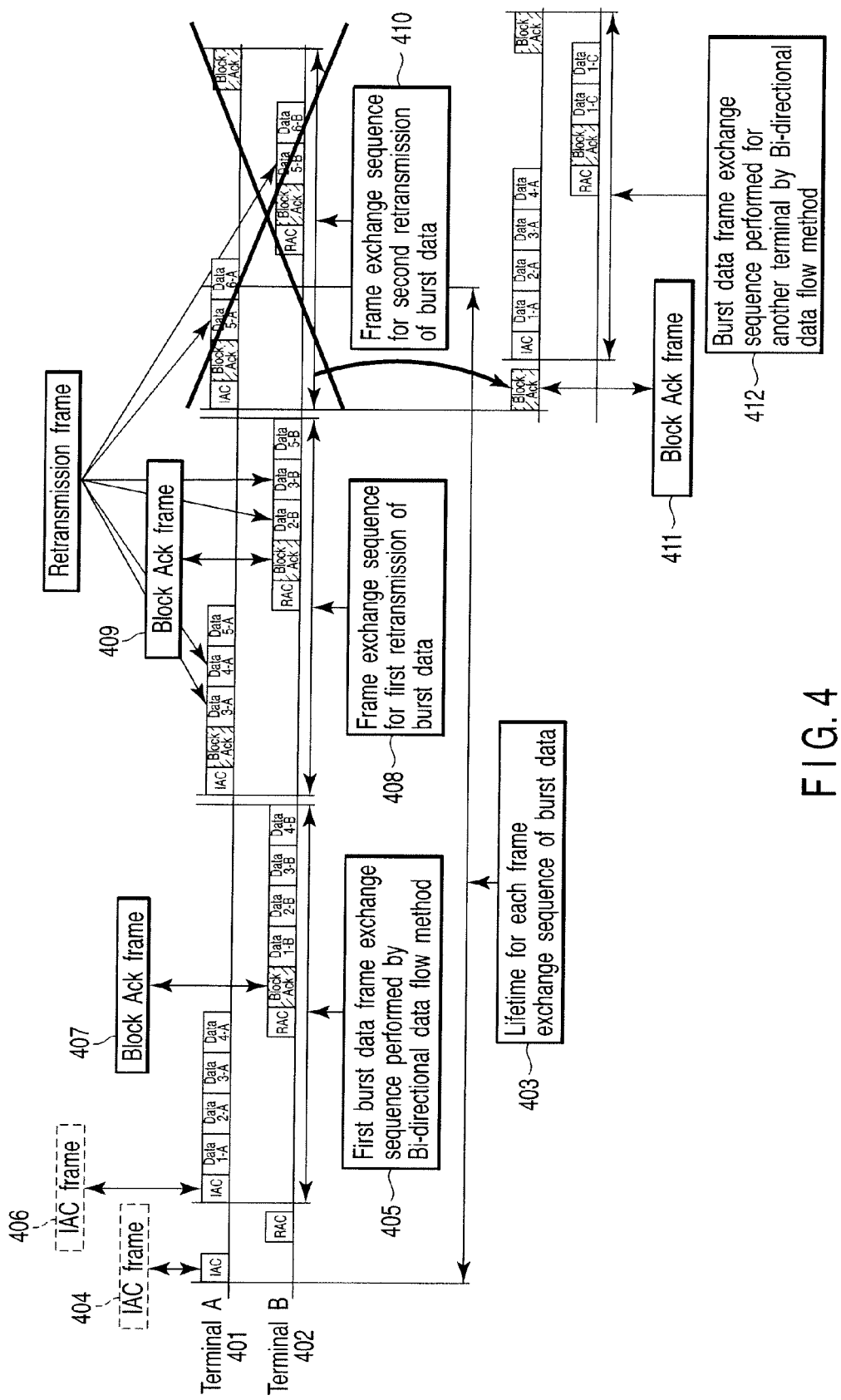
FIG. 4 is a view for explaining a retransmission limiting method using the lifetime for each frame exchange sequence of burst data when retransmission is performed in burst transmission.

A retransmission limiting method according to the present embodiment which solves the above problem by using the lifetime for each frame exchange sequence of burst data when the burst data is retransmitted by the bi-directional data flow method will be explained below with reference to FIGS. 1 and 4.

When data is stored in the transmission queue in the transmission queue manager 106 of the transmission data manager 102 of the wireless communication apparatus 101 of a terminal A 401, the transmission queue manager 106 instructs the backoff processor 108 to perform backoff processing. The backoff processor 108 instructed to perform backoff processing inquires about the use state of a radio space managed by the carrier sense unit 112. If the use state is IDLE, the backoff processor 108 performs a countdown process of backoff. After completing this backoff countdown, the backoff processor 108 notifies the transmission queue manager 106 of the completion of backoff. By this backoff completion, the terminal A 401 acquires the transmission right.

The transmission queue manager 106 notified of the backoff completion transmits the number of data stored in the transmission queue and the transmission data to the packet transmissibility determination unit 107. The packet transmissibility determination unit 107 confirms that the transmission time of each transmission has not exceeded the lifetime uniquely managed for the transmission data, and the retry count of each transmission data has not exceeded the retry limit (retransmission limitation) of the transmission data. After confirming the lifetime and retry count of each transmission data, the packet transmissibility determination unit 107 transmits the number of data stored in the transmission queue and the transmission data to the transmission/reception state manager 110 in the access controller 103. The transmission/reception state manager 110 notifies the transmitting/receiving method determination unit 109 of the number of data stored in the transmission queue to determine whether to use the bi-directional data flow method, and whether to perform IAC-RAC frame exchange before the transmission of an aggregation frame. In this embodiment, it is determined that the bi-directional data flow method is used and IAC-RAC frame exchange is performed. At this time, the transmission/reception state manager 110 notified of the determined data transmitting/receiving method from the data transmitting/receiving method determination unit 109 sets (starts) the timer of lifetime 403 for each frame exchange sequence of burst data. After that, the transmission/reception state manager 110 instructs the frame formation/transmission processor 111 to transmit an IAC frame. The frame formation/transmission processor 111 having received this IAC frame transmission instruction forms an IAC frame describing the use of the bi-directional data flow method, and transmits the formed IAC frame to the transmission processor 104. As shown in FIG. 4, the transmission processor 104 having received the IAC frame transmits it as an IAC frame 404 for starting the bi-directional data flow method from the terminal A 401 to a terminal B 402.

In the terminal B 402 having received the IAC frame 404, the frame information identification unit 113 of the reception processor 105 identifies the IAC frame describing the start of the bi-directional data flow method, and transmits to the transmission/reception state manager 110 a request signal which requests transmission of an RAC frame describing a transmission rate and frame length to be transmitted when the transmission right is given by the bi-directional data flow. The transmission/reception state manager 110, which has received this RAC frame transmission request, of the terminal B 402 refers to the data amount in the transmission queue of the transmission queue manager 106, and determines the transmission rate and frame length to be transmitted when the transmission right is given by the bi-directional data flow. The transmission/reception state manager 110 then transmits to the frame formation/transmission processor 111 an instruction to transmit the transmission rate and frame length to be transmitted when the transmission right is given by the bi-directional data flow and an RAC frame when SIFS has elapsed after the IAC frame 404 is received. The frame formation/transmission processor 111 forms an RAC frame and transmits it from the transmission processor 104.

The terminal A 401 receives from the terminal B 402 the RAC frame which responds to the IAC frame 404, and starts a first burst data frame exchange sequence 405 by the bi-directional data flow method when SIFS has elapsed after frame exchange between the IAC frame and RAC frame is completed. When the RAC frame is received by the terminal A 401, the frame information identification unit 113 of the reception processor 105 of the terminal A 401 identifies the received RAC frame. As a result of the identification of the RAC frame, the frame information identification unit 113 extracts the transmission rate and frame length, which are described in the RAC frame, to be transmitted when the terminal B 402 is given the transmission right by the bi-directional data flow, and notifies the transmission/reception state manager 110 of the data. The transmission/reception state manager 110 notifies the data transmitting/receiving method determination unit 109 of the amount of transmission queues stored in the transmission queue, and the transmission rate and frame length, which are notified by the RAC frame, to be transmitted when the terminal B 402 is given the transmission right by the bi-directional data flow. By using the values notified from the transmission/reception state manager 110, the data transmitting/receiving method determination unit 109 determines the number of data or a data frame length to be transmitted from the terminal A 401 and the value (RDG duration) of a part of a TXOP period to be given to the terminal B 402. The transmission/reception state manager 110 requests the transmission queue manager 106 to extract, from the transmission queue, transmission data necessary to perform data transmission by the number of data or the data frame length, which is determined by the data transmitting/receiving method determination unit 109, to be transmitted from the terminal A 401. The packet transmissibility determination unit 107 confirms that the transmission time of each of the transmission data extracted by the transmission queue manager 106 has not exceeded the lifetime uniquely managed for the transmission data, and that the retry count of each transmission data has not exceeded the retry limit of the transmission data, and transmits the data to the transmission/reception state manager 110. The transmission/reception state manager 110 transmits to the frame formation/transmission processor 111 the value of RDG duration determined by the data transmitting/receiving method determination unit 109, and four data frames Data 1-A, Data 2-A, Data 3-A, and Data 4-A to be transmitted by the first burst data frame exchange sequence 405 performed by the bi-directional data flow method. The frame formation/transmission processor 111 forms an IAC frame 406 by using the value of RDG duration determined by the data transmitting/receiving method determination unit 109, forms an aggregation frame by aggregating a total of five MAC frames, i.e., the IAC frame 406 and four data frames Data 1-A, Data 2-A, Data 3-A, and Data 4-A, and transmits the aggregation frame.

The terminal B 402 having received the aggregation frame formed by aggregating a total of five MAC frames, i.e., the IAC frame 406 and four data frames Data 1-A, Data 2-A, Data 3-A, and Data 4-A returns an aggregation frame when SIFS has elapsed after the aggregation frame from the terminal A 401 is received. The frame information identification unit 113 in the reception processor 105 of the terminal B 402 identifies each frame in the aggregation frame received from the terminal A 401. The frame information identification unit 113 extracts the value of RDG duration in the IAC frame 406 at the head of the aggregation frame, and notifies the transmission/reception state manager 110 of the extracted value. Then, the frame information identification unit 113 confirms the reception statuses of the plurality of data frames in the aggregation frame, and the bitmap formation unit 114 forms a bitmap of the reception statuses of the plurality of data frames and notifies the transmission/reception state manager 110 of the bitmap. The transmission/reception state manager 110 notified of the value of RDG duration in the IAC frame 406 and the bitmap of the reception statuses of the plurality of data frames extracts four transmission data Data 1-B, Data 2-B, Data 3-B, and Data 4-B from the transmission queue manager 106, in order to form an aggregation frame which can be transmitted by the value of RDG duration in the IAC frame 406. When four transmission data Data 1-B, Data 2-B, Data 3-B, and Data 4-B are extracted from the transmission queue manager 106, the packet transmissibility determination unit 107 confirms that the transmission time of each transmission data has not exceeded the lifetime uniquely managed for the transmission data, and that the retry count of each transmission data has not exceeded the retry limit of the transmission data, and transmits the four transmission data to the transmission/reception state manager 110. The transmission/reception state manager 110 transmits to the frame formation/transmission processor 111 that bitmap of the reception statuses of the plurality of data frames, which is formed by the bitmap formation unit 114, and four transmission data Data 1-B, Data 2-B, Data 3-B, and Data 4-B. The frame formation/transmission processor 111 forms an RAC frame, forms a Block Ack frame 407 by using that bitmap of the reception statuses of the plurality of data frames, which is formed by the bitmap formation unit 114, forms an aggregation frame by aggregating a total of six MAC frames, i.e., the RAC frame, the Block Ack frame 407, and four data frames Data 1-B, Data 2-B, Data 3-B, and Data 4-B, and returns this aggregation frame. Note that the value of RDG duration described in the IAC frame 406 cannot be exceeded.

When the aggregation frame returned from the terminal B 402 is received, the frame information identification unit 113 of the reception processor 105 of the terminal A 401 detects by the bitmap of the reception statuses described in the Block Ack frame 407 transmitted from the terminal B 402 that Data 3-A and Data 4-A transmitted by the terminal A 401 are not normally received. Subsequently, when a bitmap of the reception statuses of the plurality of data frames aggregated after the Block Ack frame 407 is formed by using the frame information identification unit 113 and bitmap formation unit 114, it is detected that Data 2-B and Data 3-B transmitted by the terminal B 402 are not normally received. The transmission/reception manager 110, which has collected these pieces of information indicating the abnormal receptions, of the terminal A 401 determines that retransmission is necessary. The transmission/reception manager 110, which has determined that retransmission is necessary, of the terminal A 401 notifies the packet transmissibility determination unit 107 that retransmission is to be performed, and the packet transmissibility determination unit 107 counts up the retry counts of Data 3-A and Data 4-A as the retransmission data from the terminal A 401, and confirms that each counted-up retry count has not reached the upper limit of the retry count of the data, and that the lifetime unique to each data has not expired. After confirming that the retry count has not reached the upper limit of the retry count and the lifetime unique to each data has not expired, the packet transmissibility determination unit 107 notifies the data transmitting/receiving method determination unit 109 of the frame length of a retransmission frame and the length of a new frame existing in the transmission queue, via the transmission/reception manager 110, and the data transmitting/receiving method determination unit 109 determines that period of a frame exchange sequence 408 for the first retransmission of the burst data, which is necessary when data is retransmitted. The transmission/reception manager 110 having received that period of the frame exchange sequence 408 for the first retransmission of the burst data, which is determined by the data transmitting/receiving method determination unit 109 and necessary when data is retransmitted, determines whether the frame exchange sequence 408, which is the period necessary when data is retransmitted, for the first retransmission of the burst data can be transmitted within the remaining time of the timer of the lifetime 403 for each frame exchange sequence of the burst data. If the frame exchange sequence 408 for the first retransmission of the burst data can be transmitted within the remaining time of the timer of the lifetime 403 for each frame exchange sequence of the burst data, the first retransmission of the burst data is performed.

In the frame exchange sequence 408 for the first retransmission of the burst data, the data transmitting/receiving method determination unit 109 has already confirmed that Data 3-A and Data 4-A as the retransmission data from the terminal A 401 have not reached the upper limits of the retry counts and the lifetime unique to each data has not expired, so the packet transmissibility determination unit 107 sets retry bits of Data 3-A and Data 4-A, extracts Data 5-A as new transmission data from the transmission queue manager 106, confirms that the upper limit of the retry count is not reached and the lifetime unique to the data has not expired in the same manner as for Data 3-A and Data 4-A as the retransmission data, and transmits Data 3-A and Data 4-A as the retransmission data and Data 5-A as the new transmission data to the transmission/reception manager 110. The transmission/reception manager 110 transmits, to the frame formation/transmission processor 111, that transmission period for retransmission to be given to the terminal B 402, which is determined by the data transmitting/receiving method determination unit 109, Data 3-A and Data 4-A as the retransmission data, Data 5-A as the new transmission data, and that bitmap of the statuses of the plurality of data frames aggregated after the Block Ack frame 407, which is formed by the bitmap formation unit 114. The frame formation/transmission processor 111 transmits, as the frame exchange sequence 408 for the first retransmission of the burst data, an aggregation frame formed by aggregating an IAC frame describing the transmission period for retransmission to be given to the terminal B 402, a Block Ack frame which returns the reception statuses to the terminal B 402, Data 3-A and Data 4-A as the retransmission data, and Data 5-A as the new transmission data, when SIFS has elapsed after the first burst data frame exchange sequence 405 performed by the bi-directional data flow method. After that, when transmitting data in the given transmission period for retransmission, the terminal B 402 checks the retry count and lifetime of each of Data 2-B and Data 3-B as retransmission data, as in the terminal A 401. After confirming that the upper limit of the retry count is not reached and the lifetime has not expired for both Data 2-B and Data 3-B, the terminal B 402 forms an aggregation frame by aggregating Data 2-B and Data 3-B as the retransmission data after an RAC frame and Block Ack frame while setting retry bits of Data 2-B and Data 3-B, and aggregating Data 5 as new data, and returns the aggregation frame when SIFS has elapsed, thereby performing the frame exchange sequence 408 for the first retransmission of the burst data.

When the aggregation frame returned from the terminal B 402 is received by the terminal A 401 in the frame exchange sequence 408 for the first retransmission of the burst data, the frame information identification unit 113 of the reception processor 105 of the terminal A 401 analyzes the bitmap of the reception statuses described in a Block Ack frame 409 transmitted from the terminal B 402, and detects that Data 5-A newly transmitted by the terminal A 401 in the frame exchange sequence 408 for the first retransmission of the burst data is not normally received. Then, when a bitmap of the reception statuses of the plurality of data frames aggregated after the Block Ack frame 409 is formed by using the frame information identification unit 113 and bitmap formation unit 114, it is detected that Data 3-B retransmitted by the terminal B 402 in the frame exchange sequence 408 for the first retransmission of the burst data is not normally received. The transmission/reception manager 110, which has collected these pieces of information indicating the abnormal receptions, of the terminal A 401 determines that retransmission is necessary. The transmission/reception manager 110, which has determined that retransmission is necessary, of the terminal A 401 notifies the packet transmissibility determination unit 107 that retransmission is to be performed, and the packet transmissibility determination unit 107 counts up the retry count of Data 5-A as the retransmission data from the terminal A 401, and confirms that the counted-up retry count has not reached the upper limit of the retry count of the data, and that the lifetime unique to the data has not expired. Since Data 5-A whose retry count and lifetime are confirmed is data newly transmitted in the frame exchange sequence 408 for the first retransmission of the burst data, the upper limit of the retry count is of course not reached, and the lifetime has of course not expired. Accordingly, it is determined that retransmission is necessary. Then, the packet transmissibility determination unit 107 notifies the data transmitting/receiving method determination unit 109 of the frame length of a retransmission frame and the length of a new frame existing in the transmission queue, via the transmission/reception manager 110, and the data transmitting/receiving method determination unit 109 determines that period of a frame exchange sequence 410 for the second retransmission of the burst data, which is necessary when data is retransmitted. The data transmitting/receiving method determination unit 109 notifies the transmission/reception manager 110 of the determined period of the frame exchange sequence 410 for the second retransmission of the burst data. The transmission/reception manager 110 determines whether the frame exchange sequence 410, which is notified by the data transmitting/receiving method determination unit 109 and serves as a necessary period when data is retransmitted, for the second retransmission of the burst data can be transmitted within the remaining time of the timer of the lifetime 403 for each frame exchange sequence of the burst data. As shown in FIG. 4, if the frame exchange sequence 410 for the second retransmission of the burst data cannot be transmitted within the remaining time of the timer of the lifetime 403 for each frame exchange sequence of the burst data, the transmission/reception manager 110 interrupts the retransmission process, interrupts the burst data transmission/reception process by transmitting a Block Ack frame 411 when SIFS has elapsed after the frame exchange sequence 408 for the first retransmission of the burst data, and advances to a burst data frame exchange sequence 412 performed for another terminal by the bi-directional data flow method. In this case, it is already confirmed for Data 5-A as an object of retransmission in the terminal A 401 that the retry count has not reached the upper limit of the retry count of the data and the lifetime unique to the data has not expired, so Data 5-A is returned to the transmission queue in the transmission queue manager 106.

The operation after the retransmission of the burst data is interrupted is not limited to the burst data transmission/reception process performed for another terminal by the aggregation method, and it is also possible to advance to, e.g., burst data transmission performed for another priority degree in the same terminal by the aggregation method, burst data transmission performed for another terminal by a method other than the aggregation method, burst data transmission performed for another priority degree in the same terminal by a method other than the aggregation method, QoS Cf-Poll frame transmission which initiates downlink TXOP transmission performed from a base station to a terminal by the HCCA method of IEEE 802.11e or uplink TXOP transmission performed by the HCCA method of IEEE 802.11e, or data transmission performed by an access method using CSMA/CA such as the DCF method of IEEE 802.11 or the EDCA method of IEEE 802.11e. Referring to FIG. 4, the interval between the Block Ack frame 411 and the burst data frame exchange sequence 412 performed for another terminal by the bi-directional data flow method is short. However, if the burst data frame exchange sequence 412 performed for another terminal by the aggregation method is the HCCA method, this interval can be an interval for performing PIFS carrier sense. If the burst data frame exchange sequence 412 performed for another terminal by the aggregation method is the EDCA method, this interval can be an interval for performing AIFS carrier sense and backoff processing.

Also, when the transmission/reception state manager 110 in the access controller 103 of the terminal A 401 determines whether the frame exchange sequence 410 for the second retransmission of the burst data can be transmitted within the remaining time of the timer of the lifetime 403 for each frame exchange sequence of the burst data, if the whole frame exchange sequence 410 for the second retransmission of the burst data cannot be transmitted but there is a time for transmitting and receiving only Data 5-A to be retransmitted from the terminal A 401 and Data 3-A to be retransmitted from the terminal B 402, which are the data unsuccessfully transmitted in the frame exchange sequence 408 for the first retransmission of the burst data, retransmission is performed by using only the retransmission data without attaching any new data. If there is a time for transmitting only Data 5-A as the retransmission data and Data 6-A as new data from the terminal A 401, only the data from the terminal A 401 is transmitted without using the bi-directional data flow method. That is, data transmission/reception can be performed within a transmissible range in accordance with the remaining time of the timer of the lifetime 403 for each frame exchange sequence of the burst data.

In this embodiment, as the method of selective retransmission, the Implicit Block Ack Request method proposed in IEEE 802.11n is used as a method of increasing the efficiency of the Block Ack method standardized by IEEE 802.11e. This is the method which omits a Block Ack Request frame which is necessary to receive a Block Ack frame indicating the reception status of transmission data from terminal B in the Block Ack method of IEEE 802.11e. Since the retransmission limiting method according to the present embodiment can be used regardless of the method of selective retransmission, it is unnecessary to use the Implicit Block Ack Request method as in this embodiment, and the existing Block Ack method of IEEE 802.11e may also be used. Also, in this embodiment, the number of data to be aggregated is 4 for both terminals A and B in the first frame exchange sequence, and 3 for the both in the first retransmission. However, the number of data to be aggregated does not limit the form of use of this embodiment, so the number of data to be aggregated can be variable or need not be the same for terminals A and B.

Although an IAC frame and RAC frame are exchanged at the start of data transmission in this embodiment, it is also possible to use a method in which an RTS frame and CTS frame are exchanged instead of an IAC frame and RAC frame or terminal A transmits a CTS-self frame, or to start aggregation frame transmission immediately after the data transmission right is acquired without performing any frame exchange using the IAC frame and the like. In addition, an IAC frame is used as a method by which terminal A gives a transmission period to terminal B, but another frame such as a QoS Cf-Poll frame may also be used as will be described later in the second embodiment, or the transmission period may also be described in a data frame without using any other frame. If no IAC frame is used at the head of each aggregation frame, no RAC frame is used at the head of an aggregation frame transmitted from terminal B, either.

As described above, for each transmission data which cannot be retransmitted within the remaining time of the timer of the lifetime 403 for each frame exchange sequence of burst data, the packet transmissibility determination unit 107 of the transmission data manager 102 of the wireless communication apparatus 101 determines whether to discard the transmission data by using the retry count and lifetime uniquely managed for the transmission data. The transmission data is returned to the transmission queue in the transmission queue manager 106, if the timer of the lifetime 403 for each frame exchange sequence of burst data has expired, but the retry count uniquely managed for the transmission data has not reached the upper limit of the retry count, and the lifetime uniquely managed for the transmission data has not expired. If the retry count uniquely managed for the transmission data has exceeded the upper limit of the retry count or the lifetime uniquely managed for the transmission data has expired, the data is not returned to the transmission queue but discarded.

In this embodiment as described above, the retransmission of burst data in burst transmission can be limited for each frame exchange sequence of the burst data, so scheduling calculations can be performed by taking account of the retransmission of the burst data. It is also possible to secure necessary bands for different QoS requests from a plurality of terminals or a plurality of applications.

Second Embodiment

This embodiment is basically the same as the first embodiment except that the retry count for each frame exchange sequence of burst data is used instead of using the lifetime 403 for each frame exchange sequence of burst data to limit the retransmission of the burst data as explained in the first embodiment, and that a QoS Cf-Poll frame is used instead of an IAC frame and RAC frame by the bi-directional data flow method which is a piggy back type bi-directional communication method, so the differences from the first embodiment will be mainly explained below.

Figure 5:
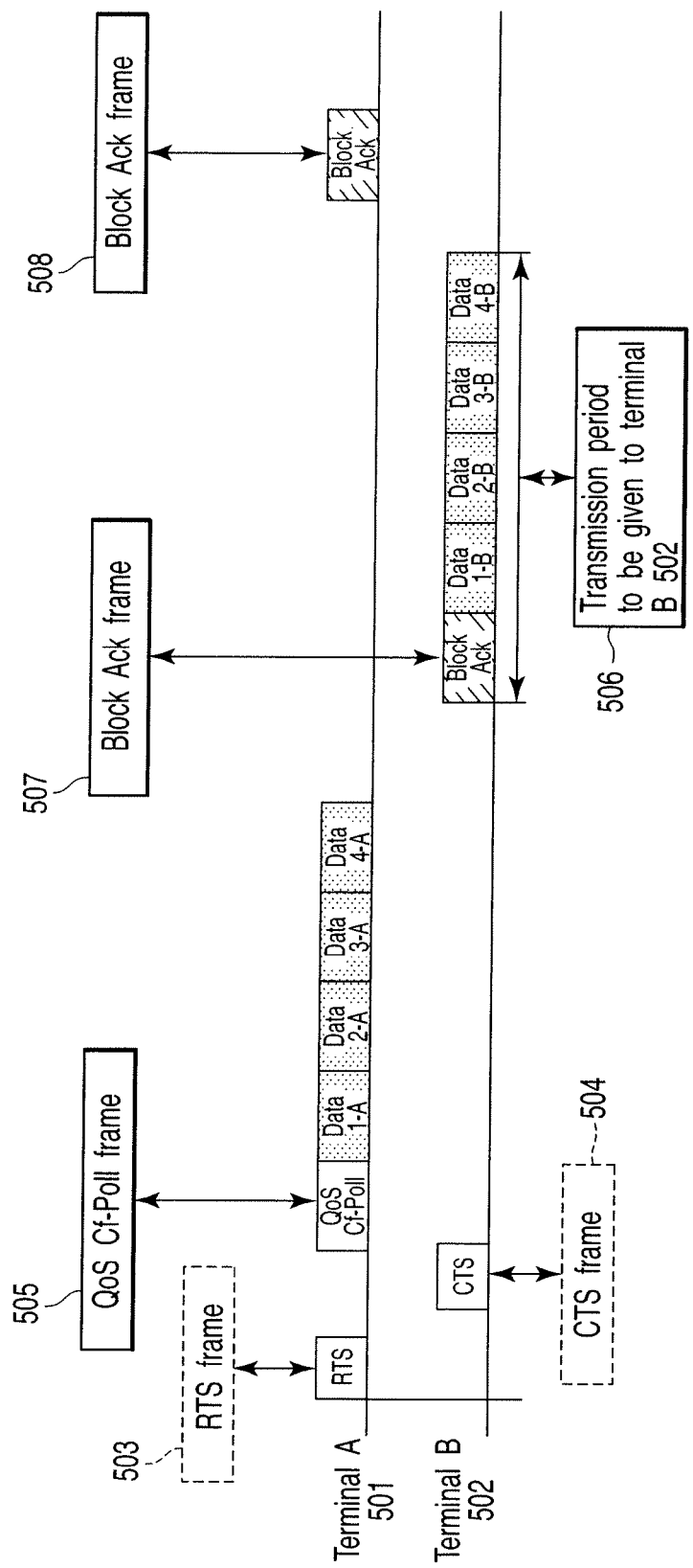
FIG. 5 is a view for explaining the bi-directional data flow method which is a piggy back type bi-directional communication method using a QoS Cf-Poll frame.

First, a communication method conforming to the bi-directional data flow method which is a piggy back type bi-directional communication method using a QoS Cf-Poll frame will be explained with reference to FIG. 5. Before data transmission, a terminal A 501 having acquired the transmission right after AIFS carrier sense and backoff processing or after PIFS carrier sense notifies a terminal B 502 that data transmission is to be performed by transmitting an RTS frame 503 to the terminal B 502. The terminal B 502 returns a CTS frame 504 to the terminal A 501, and confirms that the RTS frame 503 is received. After that, the terminal A 501 determines a period 506 to be given to the terminal B 502 by the bi-directional data flow method, and forms a QoS Cf-Poll frame 505 describing the period 506 to be given to the terminal B 502. The terminal A 501 forms an aggregation frame by aggregating the QoS Cf-Poll frame 505 and Data 1-A, Data 2-A, Data 3-A, and Data 4-A as data to be transmitted to the terminal B 502, and transmits the aggregation frame to the terminal B 502. The terminal B 502 having received the aggregation frame having the QoS Cf-Poll frame 505 attached to the head detects the period 506 to be given to the terminal B 502 from the QoS Cf-Poll frame 505. The terminal B 502 forms a Block Ack frame 507 for returning the reception statuses of Data 1-A, Data 2-A, Data 3-A, and Data 4-A as the received data, forms an aggregation frame by aggregating, after the Block Ack frame 507, Data 1-B, Data 2-B, Data 3-B, and Data 4-B as data to be transmitted to the terminal A 501, and transmits the aggregation frame. In this case, the terminal B 502 forms an aggregation frame which does not exceed the period 506 to be given to the terminal B 502 by the QoS Cf-Poll frame 505, as the aggregation frame to be returned. The terminal A 501 having received the aggregation frame returned from the terminal B 502 and having the Block Ack frame 507 attached to the head returns a Block Ack frame 508 containing the reception statuses of Data 1-B, Data 2-B, Data 3-B, and Data 4-B transmitted from the terminal B 502. When the terminal A 501 returns the Block Ack frame 508, if both the data transmitted from the terminal A 501 and the data transmitted from the terminal B 502 are normally transmitted and no more data is transmitted from the terminal A 501, the transmission process from the terminal A 501 can be completed by the transmission of the Block Ack frame 508. Also, if an NAV (Network Allocation Vector) for performing virtual carrier sense to avoid transmission from other terminals is formed more than the transmission end time of the Block Ack frame 508 by the RTS frame 503 and CTS frame 504, it is possible to use a method of clearing the NAV by transmitting a Cf-end frame when SIFS has elapsed after the transmission of the Block Ack frame 508, in order to clear the NAV.

Figure 6:
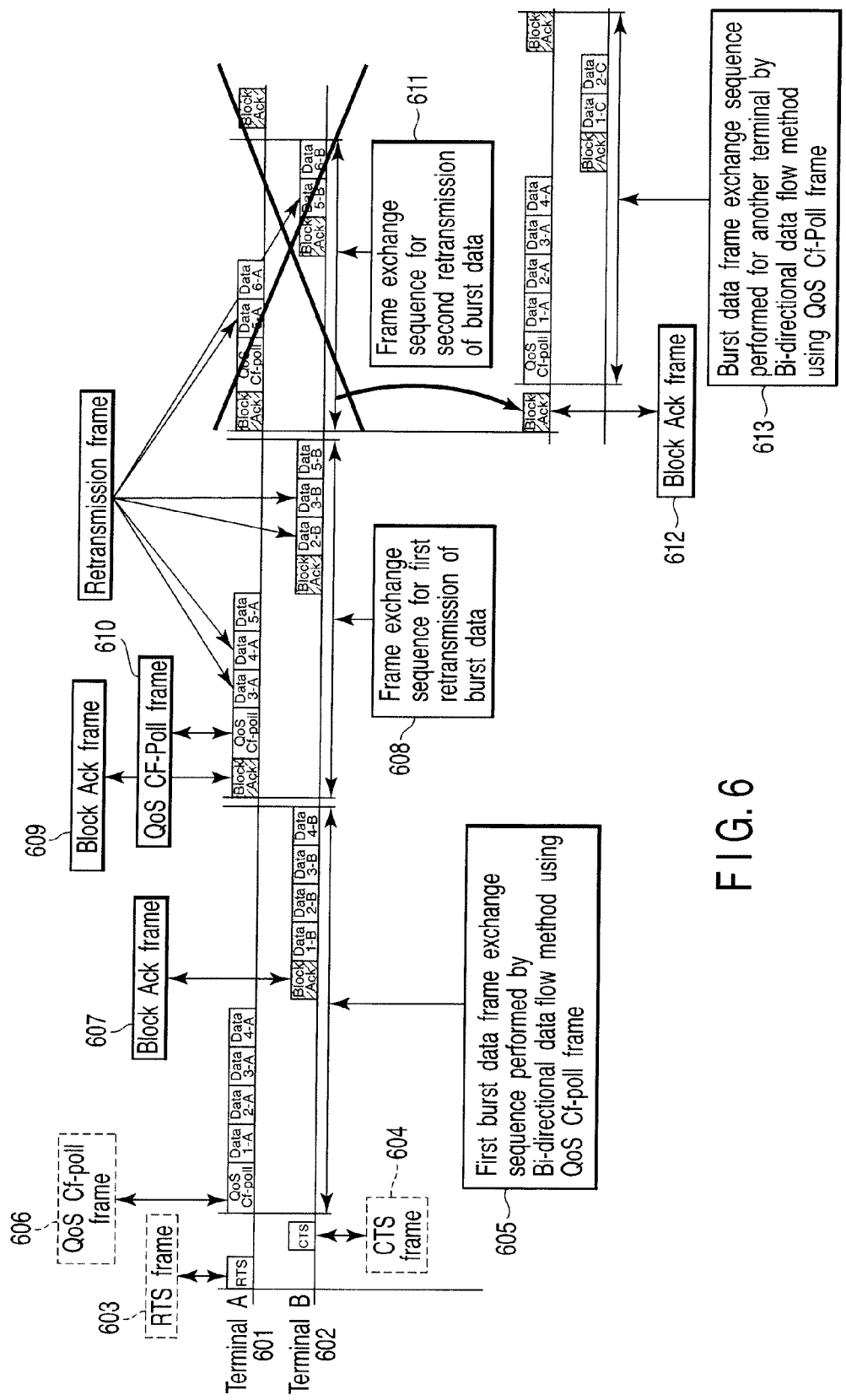
FIG. 6 is a view for explaining a retransmission limiting method according to the second embodiment, using the retry count for each frame exchange sequence of burst data.

A case in which the retry count for each frame exchange sequence of burst data is used as the retransmission limiting method according to the present embodiment when retransmission in burst transmission is performed by the bi-directional data flow method as a piggy back type bi-directional communication method using a QoS CF-Poll frame will be explained below with reference to FIGS. 1 and 6.

In this embodiment, the retry count for each frame exchange sequence of burst data is used as the limitation on retransmission in burst transmission performed by the bi-directional data flow method as a piggy back type bi-directional communication method using a QoS Cf-Poll frame, instead of the lifetime 403 for each frame exchange sequence of burst data used in the first embodiment, and the upper limit of the retry count for each frame exchange sequence of burst data is 2. That is, burst data is retransmitted only once. However, the upper limit of the retry count for each frame exchange sequence of burst data is not limited to 2, and can be adjusted in accordance with the form of use.

When data is stored in a transmission queue in a transmission queue manager 106 of a transmission data manager 102 of a wireless communication apparatus 101 of a terminal A 601, the transmission right is acquired by performing AIFS carrier sense and backoff processing or PIFS carrier sense by using a carrier sense unit 112 and backoff processor 108 in the same manner as in the first embodiment. After the transmission right is acquired, the transmission queue manager 106 transmits the number of data stored in the transmission queue and the transmission data to a packet transmissibility determination unit 107. The packet transmissibility determination unit 107 confirms that the transmission time of each transmission data has not exceeded the lifetime uniquely managed for the transmission data, and that the retry count of each transmission data has not exceeded the retry limit for the transmission data. After confirming the lifetime and retry count of each transmission data, the packet transmissibility determination unit 107 transmits the number of data stored in the transmission queue and the transmission data to a transmission/reception state manager 110 in an access controller 103. The transmission/reception state manager 110 notifies a data transmitting/receiving method determination unit 109 of the number of data stored in the transmission queue, and determines, e.g., whether to use the bi-directional data flow method, and whether to perform RTS-CTS frame exchange before transmission of an aggregation frame. In this embodiment, it is determined that the bi-directional data flow method is used and RTS-CTS frame exchange is performed. The transmission/reception state manager 110 notified of the determined data transmitting/receiving method by the data transmitting/receiving method determination unit 109 initializes the retry count for each frame exchange sequence of burst data (initializes the retry count to 0). After that, the transmission/reception state manager 110 instructs a frame formation/transmission processor 111 to transmit an RTS frame. The frame formation/transmission processor 111 having received the RTS frame transmission instruction forms an RTS frame, and transmits the formed RTS frame to a transmission processor 104. The transmission processor 104 having received the RTS frame transmits it as an RTS frame 603 for initiating the bi-directional data flow method from the terminal A 601 to a terminal B 602.

The terminal B 602 having received the RTS frame 603 returns a CTS frame 604 when SIFS has elapsed after the RTS frame 603 is received. As the frame formats of the RTS frame 603 and CTS frame 604, normal frame formats standardized by IEEE 802.11 are used. Then, the transmission/reception state manager 110 of the terminal A 601 having received the CTS frame 604 is notified of the reception of the CTS frame 604 from a frame information identification unit 113 of a reception processor 105. When starting a first burst data frame exchange sequence 605 by the bi-directional data flow method, the transmission/reception state manager 110 notifies the data transmitting/receiving method determination unit 109 of a data length to be transmitted. The data transmitting/receiving method determination unit 109 determines a transmission period to be given to the terminal B 602 when the bi-directional data flow method is used, and notifies the transmission/reception state manager 110 of the determined transmission period. The transmission/reception state manager 110 transmits, to the frame formation/transmission processor 111, Data 1-A, Data 2-A, Data 3-A, and Data 4-A as transmission data, and that transmission period to be given to the terminal B 602 when the bi-directional data flow method is used, which is determined by the data transmitting/receiving method determination unit 109. The frame formation/transmission processor 111 forms a QoS Cf-Poll frame 606 describing the transmission period to be given to the terminal B 602 when the bi-directional data flow method is used, forms an aggregation frame by aggregating the QoS Cf-Poll frame 606 and Data 1-A, Data 2-A, Data 3-A, and Data 4-A as the transmission data, and transmits the aggregation frame to the terminal B 602 by using the transmission processor 104. As in the first embodiment, the terminal B 602 forms a Block Ack frame 607 describing the reception statuses of Data 1-A, Data 2-A, Data 3-A, and Data 4-A, forms an aggregation frame by aggregating the Block Ack frame 607 and Data 1-B, Data 2-B, Data 3-B, and Data 4-B as data to be transmitted to the terminal A 601, and returns the aggregation frame to the terminal A 601. In this case, the terminal B 602 forms a frame which does not exceed that transmission period to be given to the terminal B 602 when the bi-directional data flow method is used, which is described in the QoS Cf-Poll frame 606, as the aggregation frame having the Block Ack frame 607 attached to the head.

In the first burst data frame exchange sequence 605 performed by the bi-directional data flow method, the terminal A 601 having received the aggregation frame formed by aggregating the Block Ack frame 607 and Data 1-B, Data 2-B, Data 3-B, and Data 4-B from the terminal B 602 detects that Data 3-A and Data 4-A transmitted by the terminal A 601 and Data 2-B and Data 3-B transmitted by the terminal B 602 are transmission errors and must be retransmitted, as in the first embodiment. In this case, as in the first embodiment, the transmission/reception state manager 110 determines whether the first retransmission of the burst data is possible. The transmission/reception state manager 110 counts up the retry count for each frame exchange sequence of the burst data from 0 to 1, and checks whether the retry count has exceeded 2 as the upper limit of the retry count for each frame exchange sequence of the burst data. Since the retry count for each frame exchange sequence of the burst data has not exceeded 2 as the upper limit of the retry count, the first retransmission of the burst data is performed.

In a frame exchange sequence 608 for the first retransmission of the burst data, as in the first embodiment, the packet transmissibility determination unit 107 of the terminal A 601 checks the retry count and lifetime of each of Data 3-A and Data 4-A as the retransmission data and Data 5-A as new transmission data, and transmits an aggregation frame formed by aggregating a Block Ack 609 describing the reception statuses of Data 1-B, Data 2-B, Data 3-B, and Data 4-B received from the terminal B 602, a QoS Cf-Poll frame 610 describing a period to be given to the terminal B 602 again, Data 3-A and Data 4-A as the retransmission data, and Data 5-A as the new transmission data. The terminal B 602 having received the aggregation frame transmitted from the terminal A 601 in the frame exchange sequence 608 for the first retransmission of the burst data returns an aggregation frame formed by aggregating a Block Ack frame, Data 2-B and Data 3-B as the retransmission data, and Data 5-B as new transmission data as in the first embodiment, thereby performing the frame exchange sequence 608 for the first retransmission of the burst data.

Then, after frame exchange is completed in the frame exchange sequence 608 for the first retransmission of the burst data, the transmission/reception state manager 110 of the terminal A 601 confirms transmission errors of Data 5-A transmitted by the terminal A 601 and Data 5-B transmitted by the terminal B 602. If an access controller 12 of a wireless communication apparatus 15 determines that the second retransmission is necessary, the transmission/reception state manager 110 determines whether the second retransmission of the burst data is possible.

The transmission/reception state manager 110 counts up the retry count for each frame exchange sequence of the burst data from 1 to 2, and checks whether the retry count has exceeded 2 as the upper limit of the retry count for each frame exchange sequence of the burst data. Since the retry count for each frame exchange sequence of the burst data is equal to 2 as the upper limit of the retry count, the burst data retransmission process is interrupted. In this case, the terminal A 601 interrupts the burst data transmission/reception process by transmitting a Block Ack frame 612, instead of a frame exchange sequence 611 for the second retransmission of the burst data, when SIFS has elapsed after the frame exchange sequence 608 for the first retransmission of the burst data, and advances to a burst data frame exchange sequence 613 performed for another terminal by the bi-directional data flow method using a QoS Cf-Poll frame. Since it is already confirmed for Data 5-A as an object of retransmission in the terminal A 601 that the retry count has not reached the upper limit of the retry count and the lifetime unique to the data has not expired, Data 5-A is returned to the transmission queue in the transmission queue manager 106.

The operation after the retransmission of the burst data is interrupted is not limited to the burst data transmission/reception process performed for another terminal by the bi-directional data flow method using a QoS Cf-Poll frame, and it is also possible to advance to, e.g., burst data transmission performed for another priority degree in the same terminal by the aggregation method, burst data transmission performed for another terminal by a method other than the aggregation method, burst data transmission performed for another priority degree in the same terminal by a method other than the aggregation method, QoS Cf-Poll frame transmission which initiates downlink TXOP transmission performed from a base station to a terminal by the HCCA method of IEEE 802.11e or uplink TXOP transmission performed by the HCCA method of IEEE 802.11e, or data transmission performed by an access method using CSMA/CA such as the DCF method of IEEE 802.11 or the EDCA method of IEEE 802.11e.

In this embodiment, as the method of selective retransmission, the Implicit Block Ack Request method proposed in IEEE 802.11n is used as a method of increasing the efficiency of the Block Ack method standardized by IEEE 802.11e. This is the method which omits a Block Ack Request frame which is necessary to receive a Block Ack frame indicating the reception status of transmission data from terminal B in the Block Ack method of IEEE 802.11e. Since the retransmission limiting method according to the present embodiment can be used regardless of the method of selective retransmission, it is unnecessary to use the Implicit Block Ack Request method as in this embodiment, and the existing Block Ack method of IEEE 802.11e may also be used. Also, in this embodiment, the number of data to be aggregated is 4 for both terminals A and B in the first frame exchange sequence, and 3 for the both in the first retransmission. However, the number of data to be aggregated does not limit the form of use of this embodiment, so the number of data to be aggregated can be variable or need not be the same for terminals A and B.

Although an RTS frame and CTS frame are exchanged at the start of data transmission in this embodiment, it is also possible to use a method in which an IAC frame and RAC frame are exchanged instead of an RTS frame and CTS frame or terminal A transmits a CTS-self frame, or to start aggregation frame transmission immediately after the data transmission right is acquired without performing any frame exchange using the RTS frame and the like. In addition, a QoS Cf-Poll frame is used as a method by which terminal A gives a transmission period to terminal B, but it is also possible to use an IAC frame as in the first embodiment, or describe the type of the first data frame of an aggregation frame as a Poll+ Data type frame without aggregating any other frame.

Also, although the method of exchanging one aggregation frame in turn between terminals A and B is explained in this embodiment, it is also possible to give a transmission period to terminal B after a plurality of aggregation frames are transmitted from terminal A by burst transmission with an SIFS interval or an interval shorter than that, and transmit a plurality of aggregation frames from terminal B given the transmission period by burst transmission which falls within the range of the given transmission period. In this case, however, terminal A aggregates a QoS Cf-Poll frame which gives the transmission period to the last aggregation frame of the plurality of aggregation frames to be transmitted by burst transmission, or places information which gives terminal B the transmission period in the last aggregation frame.

Alternatively, it is also possible to separate a control frame such as an acknowledgement frame from the aggregation frame, and transmit an aggregation frame formed by aggregating a plurality of data frames and the control frame by burst transmission.

As described above, for each transmission data which cannot be retransmitted because the data has exceeded the upper limit of the retry count for each frame exchange sequence of burst data, the packet transmissibility determination unit 107 of the transmission data manager 102 of the wireless communication apparatus 101 determines whether to discard the transmission data by using the retry count and lifetime uniquely managed for the transmission data. The transmission data is returned to the transmission queue in the transmission queue manager 106, if the data has exceeded the upper limit of the retry count for each frame exchange sequence of the burst data, but the retry count uniquely managed for the transmission data has not exceeded the upper limit of the retry count, and the lifetime uniquely managed for the transmission data has not expired. If the retry count uniquely managed for the transmission data has exceeded the upper limit of the retry count or the lifetime uniquely managed for the transmission data has expired, the data is not returned to the transmission queue but discarded.

In this embodiment as described above, the retransmission of burst data in burst transmission can be limited for each frame exchange sequence of the burst data, so scheduling calculations can be performed by taking account of the retransmission of the burst data. It is also possible to secure necessary bands for different QoS requests from a plurality of terminals or a plurality of applications.

Third Embodiment

In this embodiment, a retransmission process and retransmission limiting method in a case in which no transmission error occurs in data transmitted by terminal A, and a transmission error occurs in only data transmitted by terminal B, when it is determined whether to perform burst data retransmission by the bi-directional data flow method using a QoS Cf-Poll frame explained in the second embodiment, will be described below.

In this embodiment, a method of limiting retransmission by using the retry count for each frame exchange sequence of burst data as in the second embodiment will be explained. Note that although the retry count for each frame exchange sequence of burst data is used in the retransmission limiting method of this embodiment, it is also possible to use the lifetime instead of the retry count as in the first embodiment.

When this embodiment is compared with the second embodiment, transmission errors occur in data transmitted by terminal A in the second embodiment, but no such error occurs in this embodiment. Therefore, this embodiment differs from the second embodiment in the part of processing which determines whether to perform retransmission. However, the rest is basically the same as the second embodiment, so the difference from the second embodiment will be mainly explained. The basic configuration of a wireless communication apparatus is the same as shown in FIG. 1. The embodiment will be described below with reference to FIGS. 1, 7, and 8.

Figure 8:
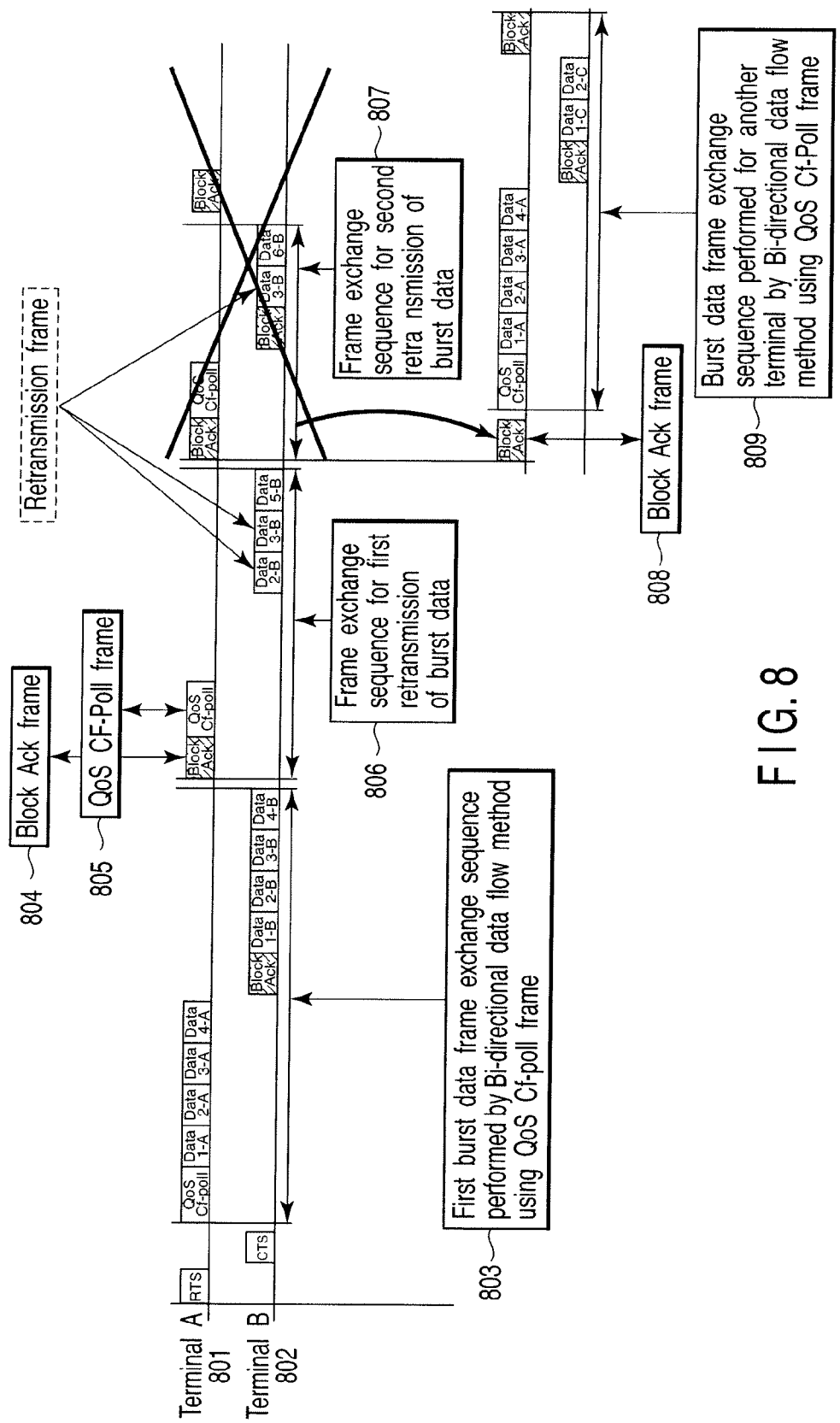
FIG. 8 is another view for explaining a retransmission limiting method according to the third embodiment.

FIG. 7 is a view for explaining a retransmission limiting method using the retry count for each frame exchange sequence of burst data in a case in which if no error occurs in transmission data from a terminal A 701 and transmission data from terminal B is generated in burst transmission performed by the bi-directional data flow method using a QoS Cf-Poll frame, new data is transmitted from terminal A and the data is retransmitted from terminal B. FIG. 8 is a view for explaining a retransmission limiting method using the retry count for each frame exchange sequence of burst data in a case in which if no error occurs in transmission data from terminal A and transmission data from terminal B is generated in burst transmission performed by the bi-directional data flow method using a QoS Cf-Poll frame, no new data is transmitted from terminal A and the data is retransmitted from terminal B.

In this embodiment, the upper limit of the retry count for each frame sequence of burst data is 2, and burst data is retransmitted only once, as in the second embodiment. However, the upper limit of the retry count for each frame exchange sequence of burst data is not limited to 2, and can be adjusted in accordance with the form of use.

As shown in FIG. 7, when a first burst data frame exchange sequence 703 performed by the bi-directional data flow method using a QoS Cf-Poll frame starts, a transmission/reception state manager 110 of an access controller 103 of the terminal A 701 initializes the retry count for each frame exchange sequence of burst data (initializes the retry count to 0). If all data transmitted by the terminal A 701 are normally received by a terminal B 702 in the first burst data frame exchange sequence 703 performed by the bi-directional data flow method, a Block Ack frame 704 formed by the terminal B 702 indicates that Data 1-A, Data 2-A, Data 3-A, and Data 4-A transmitted by the terminal A 701 are normally received. The transmission/reception state manager 110 of the terminal A 701 having received an aggregation frame returned by the terminal B 702 in the first burst data frame exchange sequence 703 detects from the Block Ack frame 704 that all the data transmitted by the terminal A 701 are normally received and no retransmission is necessary. However, if Data 2-B and Data 3-B of Data 1-B, Data 2-B, Data 3-B, and Data 4-B transmitted by the terminal B 702 are not received, the transmission/reception state manager 110 of the terminal A 701 detects from a reception status bitmap formed by a bitmap formation unit 114 in a reception processor 105 of the terminal A 701 that it is necessary to retransmit Data 2-B and Data 3-B to be returned to the terminal B 702. Accordingly, the transmission/reception state manager 110 of the terminal A 701 determines that the first retransmission of the burst data is necessary in order for the terminal B 702 to perform a retransmission process, and determines whether the first retransmission of the burst data is possible as in the second embodiment.

The transmission/reception state manager 110 counts up the retry count for each frame exchange sequence of the burst data from 0 to 1, and checks whether the retry count has exceeded 2 as the upper limit of the retry count for each frame exchange sequence of the burst data. Since the retry count for each frame exchange sequence of the burst data has not exceeded 2 as the upper limit of the retry count, the first retransmission of the burst data is performed.

In a frame exchange sequence 705 for the first retransmission of the burst data, a data transmitting/receiving method determination unit 109 of the terminal A 701 determines a transmission period to be allocated to the terminal B 702. A frame formation/transmission processor 111 notified of that transmission period to be allocated to the terminal B 702, which is determined by the data transmitting/receiving method determination unit 109, forms a QoS Cf-Poll frame, aggregates, after this QoS Cf-Poll frame, a Block Ack 706 describing the reception statuses of the data transmitted from the terminal B 702 in the first burst data frame exchange sequence 703, forms an aggregation frame by further aggregating new data Data 5-A, Data 6-A, and Data 7-A to be transmitted to the terminal B 702, and transmits the aggregation frame. The terminal B 702 which is given the transmission period for retransmission in the frame exchange sequence 705 for the first retransmission of the burst data checks the retry count and lifetime of each retransmission data as in the second embodiment, aggregates, after a Block Ack frame, Data 2-B and Data 3-B for each of which it is confirmed that the upper limit of the retry count is not reached and the lifetime has not expired, forms an aggregation frame by further aggregating new data Data 5-B, and transmits the aggregation frame to the terminal A 701.

Then, after frame exchange is completed in the frame exchange sequence 705 for the first retransmission of the burst data, if the transmission/reception state manager 110 of the terminal A 701 determines that the data transmitted by the terminal A 701 are normally received, transmission errors occur in the data transmitted by the terminal B 702, and the second retransmission is necessary, as before the start of the frame exchange sequence 705 for the first retransmission of the burst data, the transmission/reception state manager 110 determines whether the second retransmission of the burst data is possible.

The transmission/reception state manager 110 counts up the retry count for each frame exchange sequence of the burst data from 1 to 2, and checks whether the retry limit has exceeded 2 as the upper limit of the retry count for each frame exchange sequence of the burst data. Since the retry count for each frame exchange sequence of the burst data is equal to 2 as the upper limit of the retry count, the transmission/reception state manager 110 interrupts the burst data retransmission process, interrupts the burst data transmission/reception process by transmitting a Block Ack frame 708 when SIFS has elapsed after the frame exchange sequence 705 for the first retransmission of the burst data, and advances to a burst data frame exchange sequence 709 performed for another terminal by the bi-directional data flow using a QoS Cf-Poll frame. The operation after the retransmission of the burst data is interrupted is not limited to the burst data transmission/ reception process performed for another terminal by the bi-directional data flow method using a QoS Cf-Poll frame, and it is also possible to advance to, e.g., burst data transmission performed for another priority degree in the same terminal by the aggregation method, burst data transmission performed for another terminal by a method other than the aggregation method, burst data transmission performed for another priority degree in the same terminal by a method other than the aggregation method, QoS Cf-Poll frame transmission which initiates downlink TXOP transmission performed from a base station to a terminal by the HCCA method of IEEE 802.11e or uplink TXOP transmission performed by the HCCA method of IEEE 802.11e, or data transmission performed by an access method using CSMA/CA such as the DCF method of IEEE 802.11 or the EDCA method of IEEE 802.11e.

Also, as shown in FIG. 8, in a case in which if no error occurs in transmission data of a terminal A 801 which has initiated burst data transmission by the bi-direction data flow method using a QoS Cf-Poll frame, errors occur in only transmission data of a terminal B 802, and there is no new transmission data from the terminal A 801, a retransmission process is performed to give a transmission period to the terminal B 802 in order to retransmit the data which is transmitted from the terminal B 802 but is not received, this band allocation for retransmission may also be performed by the retransmission limiting method using the retry count for each frame exchange sequence of the burst data in the same manner as in FIG. 7.

After a first burst data frame exchange sequence 803 performed by the bi-directional data flow method using a QoS Cf-Poll frame, if no error occurs in data transmitted from the terminal A 801 and Data 2-B and Data 3-B transmitted from the terminal B 802 are transmission errors, a transmission/ reception state manager 110 of the terminal A 801 determines whether to perform a retransmission process for giving the terminal B 802 a transmission period for retransmission. If no new transmission data exists in the terminal A 801 when the burst data retransmission process is to be performed, after the first burst data frame exchange sequence 803 performed by the bi-directional data flow method using a QoS Cf-Poll frame is completed, the terminal A 801 transmits an aggregation frame formed by aggregating a Block Ack frame 804 and a QoS Cf-Poll frame 805 describing the transmission period to be allocated to the terminal B 802, and the terminal B 802 returns an aggregation frame formed by aggregating Data 2-B and Data 3-B as the retransmission data and Data 5-B as new data, thereby performing a frame exchange sequence 806 for the first retransmission of the burst data. As explained with reference to FIG. 7, the transmission/reception state manager 110 of the terminal A 801 can limit the retransmission by using the retry count for each frame exchange sequence of the burst data in the retransmission limiting method in this case as well. After the frame exchange sequence 806 for the first retransmission of the burst data, therefore, the transmission/reception state manager 110 interrupts the burst data transmission/reception process by transmitting a Block Ack frame 808 when SIFS has elapsed after the frame exchange sequence 806 for the first retransmission of the burst data, without performing a frame exchange sequence 807 for the second retransmission of the burst data, and advances to a burst data frame exchange sequence 809 performed for another terminal by the bi-directional data flow method using a QoS Cf-Poll frame. The operation after the retransmission of the burst data is interrupted is not limited to the burst data transmission/reception process performed for another terminal by the bi-directional data flow method using a QoS Cf-Poll frame, and it is also possible to advance to, e.g., burst data transmission performed for another priority degree in the same terminal by the aggregation method, burst data transmission performed for another terminal by a method other than the aggregation method, burst data transmission performed for another priority degree in the same terminal by a method other than the aggregation method, QoS Cf-Poll frame transmission which initiates downlink TXOP transmission performed from a base station to a terminal by the HCCA method of IEEE 802.11e or uplink TXOP transmission performed by the HCCA method of IEEE 802.11e, or data transmission performed by an access method using CSMA/CA such as the DCF method of IEEE 802.11 or the EDCA method of IEEE 802.11e.

Although a method of limiting retransmission by using the retry count for each frame exchange sequence of burst data is explained in this embodiment, it is also possible to use the lifetime for each frame exchange sequence of burst data as in the first embodiment. When this lifetime is used, if the remaining period of the lifetime for each frame exchange sequence of burst data is short, it is also possible to use, when a retransmission process is performed, a method by which an aggregation frame formed by aggregating only the Block Ack frame 804 and QoS Cf-Poll frame 805 is transmitted without transmitting any new data from terminal A as shown in FIG. 8, only a period during which data having a reception error and required to be retransmitted can be transmitted is given as the transmission period to be allocated to the terminal B 802, and an aggregation frame formed by aggregating only the retransmission data is returned.

In this embodiment, as the method of selective retransmission, the Implicit Block Ack Request method proposed in IEEE 802.11n is used as a method of increasing the efficiency of the Block Ack method standardized by IEEE 802.11e. This is the method which omits a Block Ack Request frame which is necessary to receive a Block Ack frame indicating the reception status of transmission data from terminal B in the Block Ack method of IEEE 802.11e. Since the retransmission limiting method according to the present embodiment can be used regardless of the method of selective retransmission, it is unnecessary to use the Implicit Block Ack Request method as in this embodiment, and the existing Block Ack method of IEEE 802.11e may also be used. Also, in this embodiment, the number of data to be aggregated is 4 for both terminals A and B in the first frame exchange sequence, and 3 for the both in the first retransmission. However, the number of data to be aggregated does not limit the form of use of this embodiment, so the number of data to be aggregated can be variable or need not be the same for terminals A and B.

Although an RTS frame and CTS frame are exchanged at the start of data transmission in this embodiment, it is also possible to use a method in which an IAC frame and RAC frame are exchanged instead of an RTS frame and CTS frame or terminal A transmits a CTS-self frame, or to start aggregation frame transmission immediately after the data transmission right is acquired without performing any frame exchange using the RTS frame and the like. In addition, a QoS Cf-Poll frame is used as a method by which terminal A gives a transmission period to terminal B, but it is also possible to use an IAC frame as in the first embodiment, or describe data by using a duration/ID field of a Block Ack frame without aggregating any other frame.

In this embodiment as described above, even when no error occurs in transmission data of terminal A and an error occurs in only transmission data of terminal B in data transmission/reception performed by the bi-directional data flow method, a retransmission band can be allocated to terminal B, thereby reducing the process by which terminal B reacquires the transmission right for retransmission.

Also, the retransmission of burst data in burst transmission can be limited for each frame exchange sequence of the burst data, so scheduling calculations can be performed by taking account of the retransmission of the burst data. It is also possible to secure necessary bands for different QoS requests from a plurality of terminals or a plurality of applications.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A wireless communication apparatus comprising:
a transmitting device configured to transmit a first aggregation frame in which a plurality of first transmission data frames are aggregated;
a measuring device configured to measure a number value of retransmission of each of the plurality of first transmission data frames;
a storage to store a limiting value of the number value of retransmission;
a determination device configured to determine whether the number value of retransmission of each of the plurality of first transmission data frames exceeds the limiting value;
a transmission buffer configured to buffer first transmission data frames of the plurality of first transmission data frames for which it is determined that the number value of retransmission does not exceed the limiting value, and discard first transmission data frames of the plurality of first transmission data frames for which it is determined that the number value of retransmission exceeds the limiting value; and
a retransmitting device configured to retransmit a second aggregation frame in which the first transmission data frames of the plurality of first transmission data frames buffered in the transmission buffer are aggregated.

2. A wireless communication apparatus comprising:
a transmitting device configured to transmit a first aggregation frame in which a plurality of first transmission data frames are aggregated, to a transmission destination apparatus;
a receiving device configured to receive, from the transmission destination apparatus, a reception acknowledgement frame indicating whether a reception error has occurred in the plurality of transmission data frames;
a measuring device configured to measure a number value of retransmission of each of the plurality of first transmission data frames;
a storage to store a limiting value of the number value of retransmission;
a determination device configured to determine whether the number value of retransmission of each of the plurality of first transmission data frames exceeds the limiting value;
a transmission buffer device configured to buffer first transmission data frames of the plurality of first transmission data frames for which it is determined that a reception error has occurred in the transmission destination apparatus and that the number value of retransmission does not exceed the limiting value, and discard first transmission data frames of the plurality of first transmission data frames for which it is determined that the number value of retransmission exceeds the limiting value; and
a retransmitting device configured to retransmit a second aggregation frame in which the first transmission data frames of the plurality of first transmission data frames buffered in the transmission buffer are aggregated.

3. A wireless communication method comprising:
transmitting a first aggregation frame in which a plurality of first transmission data frames are aggregated;
measuring a number value of retransmission of each of the plurality of first transmission data frames;
storing a limiting value of the number value of retransmission;
determining whether the number value of retransmission of each of the plurality of first transmission data frames exceeds the limiting value;
buffering first transmission data frames of the plurality of first transmission data frames for which it is determined that the number value of retransmission does not exceed the limiting value in a transmission buffer, and discarding first transmission data frames of the plurality of first transmission data frames for which it is determined that the number value of retransmission exceeds the limiting value; and
retransmitting a second aggregation frame in which the first transmission data frames of the plurality of first transmission data frames buffered in the transmission buffer are aggregated.

4. A wireless communication method comprising:
transmitting a first aggregation frame in which a plurality of first transmission data frames are aggregated, to a transmission destination apparatus;
receiving, from the transmission destination apparatus, a reception acknowledgement frame indicating whether a reception error has occurred in the plurality of transmission data frames;
measuring a number value of retransmission of each of the plurality of first transmission data frames;
storing a limiting value of the number value of retransmission;
determining whether the number value of retransmission of each of the plurality of first transmission data frames exceeds the limiting value;
buffering, in a transmission buffer, first transmission data frames of the plurality of first transmission data frames for which it is determined that a reception error has occurred in the transmission destination apparatus and that the number value of retransmission does not exceed the limiting value, and discarding first transmission data frames of the plurality of first transmission data frames for which it is determined that the number value of retransmission exceeds the limiting value; and
retransmitting a second aggregation frame in which the first transmission data frames of the plurality of first transmission data frames buffered in the transmission buffer are aggregated.

5. A wireless communication apparatus which gives a part of a transmission opportunity period to another wireless communication apparatus and performs bi-directional communication with the another wireless communication apparatus, comprising:

a transmission device configured to transmit a plurality of first data frames during the transmission opportunity period;

a reception device configured to receive a first acknowledgement frame for first data frames and receive at least one second data frame, during the part of the transmission opportunity period; and a retransmission limiting device configured to perform retransmission limitation when a retransmission process needs to be performed due to an error that has occurred in at least one first data frame, wherein the bi-directional communication is associated with a frame exchange sequence including at least transmitting and retransmitting first data frames as well as transmitting and retransmitting the at least one second data frame, and wherein the retransmission limiting device determines whether or not to perform retransmission limitation, based on a retransmission allowable count or retransmission allowable period, for each frame exchange sequence.

6. The apparatus according to claim 5, further comprising a detection device configured to detect an error in the second data frame, wherein if an error has occurred in the second transmission data frame, a communication period is further given to the another wireless communication apparatus in order to retransmit a second transmission data frame containing an error.

7. The apparatus according to claim 5, wherein the transmission device is further configured to transmit a second acknowledgement frame for the second data frames and at least a third data frame.

8. The apparatus according to claim 5, wherein the first data frames are included in a physical frame, and wherein the first acknowledgement frame and the second data frame are included in a physical frame.

9. The apparatus according to claim 5, wherein the first acknowledgement frame is included in a first physical frame, and the second data frame is included in a second physical frame.

10. A wireless communication apparatus which is given a part of a transmission opportunity period from another wireless communication apparatus and performs bi-directional communication with the another wireless communication apparatus, comprising:

a reception device configured to receive a plurality of first data frames during the transmission opportunity period;

a transmission device configured to transmit an acknowledgement frame for first data frames and transmit at least one second data frame, during the part of the transmission opportunity period; and a retransmission limiting device configured to perform retransmission limitation when a retransmission process needs to be performed due to an error that has occurred in the second data frame, wherein the bi-directional communication is associated with a frame exchange sequence including at least transmitting and retransmitting first data frames as well as transmitting and retransmitting the at least one second data frame, and wherein the retransmission limiting device determines whether or not to perform retransmission limitation, based on a retransmission allowable count or retransmission allowable period, for each frame exchange sequence.

* * * * *